Sept. 5, 1967   E. VALENZUELA   3,339,877
REAR VISION MIRROR CONSTRUCTION
Filed Dec. 12, 1963

Efren Valenzuela
INVENTOR.

United States Patent Office 3,339,877
Patented Sept. 5, 1967

3,339,877
REAR VISION MIRROR CONSTRUCTION
Efren Valenzuela, El Paso, Tex., assignor of one-third to Frank Owen III, El Paso, Tex.
Filed Dec. 12, 1963, Ser. No. 330,185
2 Claims. (Cl. 248—481)

This invention relates to a novel and useful rear vision mirror construction and more specifically to a rear vision mirror adapted to be mounted in a motor vehicle or the like and constructed in a manner whereby the mirror element thereof is swivelly supported and yet releasably clampingly retained in adjusted swivelled position.

While conventional rear vision mirror constructions of the type used in motor vehicles are provided with mirror elements that are swivelly supported, they include a friction connection between the swivelly connected mirror element and support member which is either preset or which may be adjusted only by the use of a given tool.

These conventional types of mirror constructions must necessarily employ a friction connection between the mirror element and the support member which is not too tight in order that the mirror element may be adjustably swivelled relative to the support member when it is desired to do so. Therefore, it is possible for conventional mirror assemblies to have the mirror element thereof accidentally jarred out of its proper swivelled position relative to the support member. Such mis-positioning of the mirror element of a conventional mirror assembly is undesirable and therefore the driver of a vehicle must occasionally readjust the position of the mirror element on the support member. Not only is the necessity for occasionally readjusting the mirror element bothersome but such occasional readjustment of the frictionally engaged portions of the mirror assembly will ultimately result in the frictional connection being loosened due to wear between the frictionally engaged and relatively movable parts of the mirror assembly. When this happens, it is necessary to use a special tool in order to tighten the adjustable frictional connections and in the case where a present and non-adjustable frictional connection is utilized the loosening of the preset frictional connection requires replacement of the mirror assembly in order that a properly functioning mirror assembly may be provided.

It is accordingly the main object of this invention to provide a rear vision mirror construction adapted for use in motor vehicles and the like and constructed in a manner whereby the mirror element thereof includes a releasable but tight frictional swivel connection with the support member for the mirror element. With this construction, it is highly unlikely that the mirror element will be accidentally dislodged from its preset position due to its relatively tight frictional engagement with the support member and yet the releasable frictional swivel connection may be loosened whenever it is desired to adjust the positioning of the mirror element relative to the support member therefor such as is the case when different persons of different size drive the motor vehicle in which the rear vision mirror construction is mounted.

A further object of this invention, in accordance with the immediately preceding object, is to provide a releasable frictional swivel connection between a mirror element and its suport including an actuator for loosening the swivel connection that may be readily actuated and which is movable between an inoperative position and an operative position releasing the swivel connection and is normally yieldingly urged toward the inoperative position.

A still further object of this invention, in accordance with the immediately preceding object, is to provide an actuator which includes at least one portion thereof which may be manipulated and is disposed slightly behind one end of a conventional rear vision mirror element and is therefore readily engageable by the fingers of a person's hand when that hand is being utilized to grip the one end of the mirror element in order to reposition the latter relative to its support member.

Another object of this invention, is to provide an improved swivel connection of the aforementioned type including means by which the frictional connection formed thereby may be adjusted.

A final object of this invention to be specifically enumerated herein is to provide a rear vision mirror construction in accordance with the preceding objects which will conform to conventional forms of manufacture, be of simple construction and easy to use so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 2:
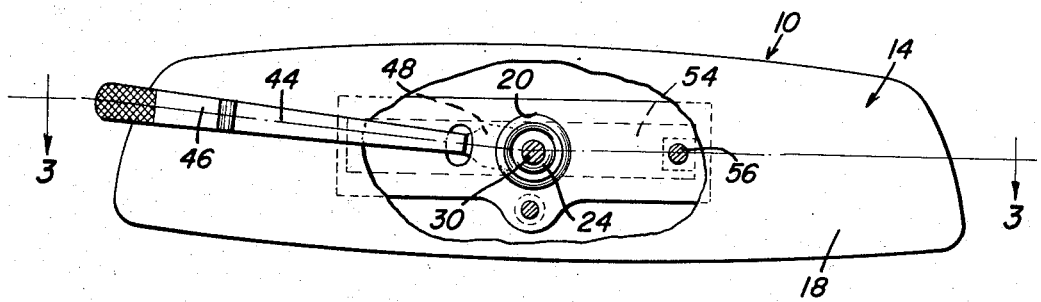
FIGURE 2 is an enlarged rear elevational view of the mirror assembly with parts thereof being broken away and shown in section.
Figure 3:
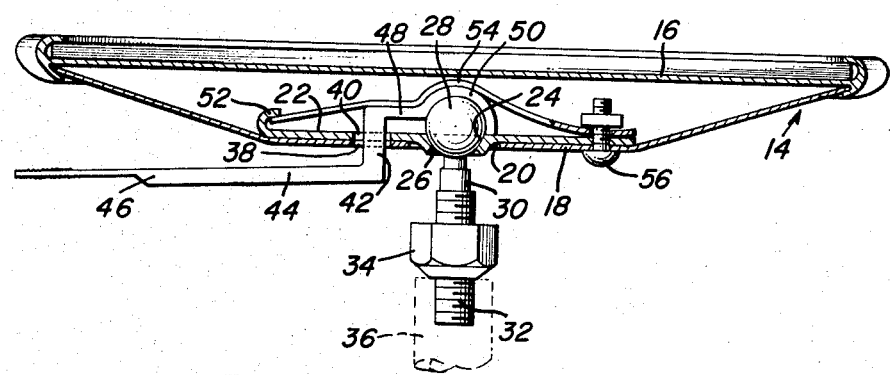
Figure 4:
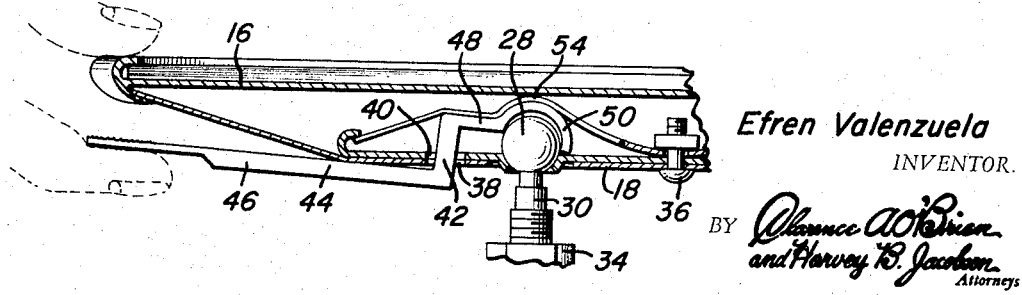

FIGURE 3 is a horizontal sectional view taken substantially upon the plane indicated by the section line 3—3 of FIGURE 2; and FIGURE 4 is a fragmentary horizontal sectional view similar to that of FIGURE 3 but showing the manner in which the releasable frictional swivel connection between the mirror element and the support member for the mirror assembly may be readily loosened whenever it is desired to reposition the mirror element relatvie to its supporting member.

Figure 1:
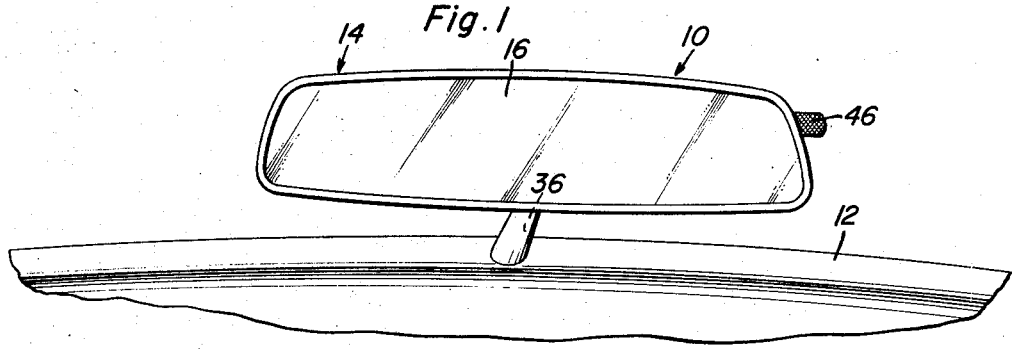
FIGURE 1 is a front elevational view of the rear vision mirror construction of the instant invention shown mounted on a portion of a vehicle dashboard.

Referring now more specifically to the drawings the numeral 10 generally designates the rear vision mirror construction of the instant invention which is shown in FIGURE 1 of the drawings supported from the dashboard 12 of a conventional form of motor vehicle. Although the mirror construction 10 is illustrated and described herein as being used in connection with a motor vehicle and supported from the dashboard of the motor vehicle, it is to be noted that the mirror construction could be utilized on the other types of vehicles and mounted in other locations than on the dashboard of the motor vehicle.

The rear vision mirror construction of the instant invention includes a mirror housing generally referred to by the reference numeral 14 and a mirror element 16 which is secured in the forward end of the housing 14. The rear wall 18 of the housing 14 is centrally apertured as at 20 and has a reinforcing plate 22 secured to its inner face in any convenient manner. The central portion of the reinforcing plate 22 defines a partial semispherical recess 24 which opens inwardly of the housing 14 and which is centrally apertured as at 26. The laterally struck portions of the reinforcing plate 22 which form the recess 24 project slightly outwardly through the aperture 20 and cradle or seatingly receive a partial spherical enlargement or head 28 formed on one end of an elongated shank 30 whose other end is externally threaded as at 32. The externally threaded end of the shank 30 is adapted to be readily engaged in any suitable supporting surface and has a jamb nut 34 mounted thereon for securing the shank 30 in adjusted rotated position relative to the support 36.

The rear wall 18 and reinforcing plate 22 are provided with aligned apertures 38 and 40 respectively and loosely receive a laterally directed intermediate portion 42 of an elongated actuating lever 44 including a handle end 46 on one side of the intermediate portion 42 and a straight extension 48 on the other side of the intermediate portion 42 including a partial spherical socket-defining portion 50 on its free end which opens toward the recess or socket 24.

One end of the reinforcing plate 22 is curved back upon itself as at 52 to define a retaining flange and a contoured leaf spring 54 has one end thereof inserted behind the retaining flange while the other end thereof is secured to the housing 14 by means of an adjustable fastener 56, the intermediate portion of the contoured leaf spring conforming to the forward surfaces of the extension 48 and the socket defining portion 50.

The leaf spring 54 is of sufficient strength to urge the socket defining portion toward the recess 24 with sufficient force to tightly clampingly engage the generally spherical head 28 between the reinforcing plate 22 and the socket defining portion 50 whereupon a swivel connection between the housing 14 of the shank 30 is formed. In addition, this swivel connection includes a tight frictional engagement with the head 28 and therefore strongly resists swivelling of the housing 14 relative to the shank 20. However, the end of the socket defining portion 50 remote from the extension 48 is spaced closely adjacent the reinforcing plate 52 whereby forward movement of the handle portion 46 will result in contact of the right side of the socket defining portion, as viewed in FIGURE 3 of the drawings, with the front face of the reinforcing plate 52 with this point of contact defining a fulcrum about which the free end of the handle portion 46 may be swung, which swinging movement will move the socket defining portion 50 away from the recess 24 as pictured in FIGURE 4 of the drawings thereby releasing the tight frictional engagement of the generally spherical socket defined by the socket defining portion 50 in the recess 24 with the spherical head 28. With the socket defining portion 50 shifted away from the recess 24 as shown in FIGURE 4 of the drawings, the housing 14 may be readily swivelled relative to the shank 30 to the desired position whereupon the free end of the handle portion 46 may be released in order that the housing 14 may be again tightly frictionally retained in adjusted position.

It may be seen from the drawings that the free end of the handle portion 46 is spaced slightly rearwardly of the righthand side of the housing 14 as viewed in FIGURE 1 of the drawings whereby a person grasping the right end of the mirror assembly 10 with his right hand may readily contact the front of the housing 14 with his thumb and the free end of the handle portion 46 with his index finger, after which the handle portion 46 may be swung forwardly as shown in FIGURE 4 of the drawings to release the housing 14 from tight frictional engagement with the enlarged head 28. Therefore, the mirror assembly 10 includes a housing which is normally tightly frictionally retained in adjusted position relative to its supporting shank and yet which may be readily shifted in adjusted position and then again tightly frictionally retained in the newly adjusted position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rear vision mirror construction comprising a housing having a mirror element supported therefrom, said housing including first means defining an apertured spherical socket, a mounting shank having means on one end adapted to be secured to a support member and a partial spherical head on the other end disposed in said socket, said means defining said socket including first and second portions movable relative to and toward and away from each other defining remote portions of said socket, second means yieldingly urging said first and second portions toward each other for clampingly engaging said head therebetween and to retain said housing in adjusted swivelled position relative to said shank, and means operatively connected to one of said first and second portions for selectively displacing said one portion away from the other portion, said housing including a rear wall including portions defining said centrally and inwardly opening apertured partial semi-spherical socket comprising said first portion, said shank extending through said aperture, said rear wall also defining a second aperture, a lever arm extending through said second aperture and having a second partial semi-spherical socket opening toward and spaced from said apertured socket comprising said second portion, said rear wall including an inwardly extending and curved retaining flange, a leaf spring in said housing having one end inserted under the retaining flange, the other end of said spring being adjustably connected to the housing by means of an adjustable fastener, the central portion of said spring engaging said second partial semi-spherical socket for yieldingly urging the latter toward said apertured partial semi-spherical socket and comprising said second means.

2. The combination of claim 1 wherein the central portion of said spring is contoured to conform with the surface of the second partial semi-spherical socket which it engages, said second partial semi-spherical socket having a straight extension thereon in engagement with the inner surface of said leaf spring between the central contoured portion thereof and the end thereof which extends under the flange to facilitate movement of the spring away from the second partial semi-spherical socket.

References Cited

UNITED STATES PATENTS

| | | | |
|---|---|---|---|
| 1,386,959 | 8/1921 | Severance et al. | 248—481 |
| 1,910,864 | 5/1933 | Szyminski | 248—288 X |
| 1,992,828 | 2/1935 | Hodny et al. | 248—181 X |
| 2,969,714 | 1/1961 | Cousino | 248—481 |

CHANCELLOR E. HARRIS, *Primary Examiner.*

F. DOMOTOR, *Assistant Examiner.*